Dec. 9, 1947.   S. DE LANO   2,432,228
AUTOMOBILE TRANSPORTING VEHICLE
Filed Feb. 25, 1946   2 Sheets-Sheet 1

INVENTOR.
Sidney DeLano
BY
Att'y

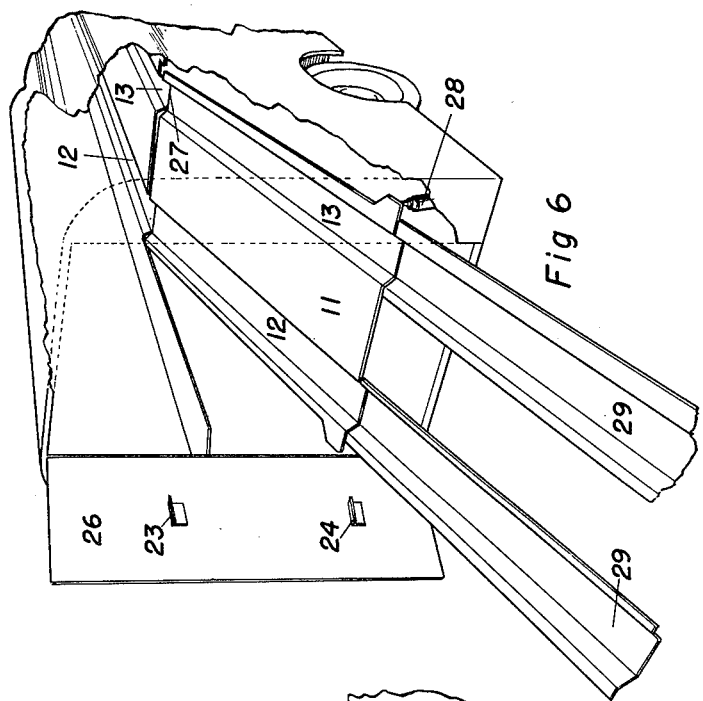
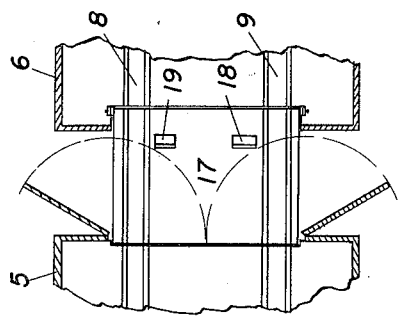
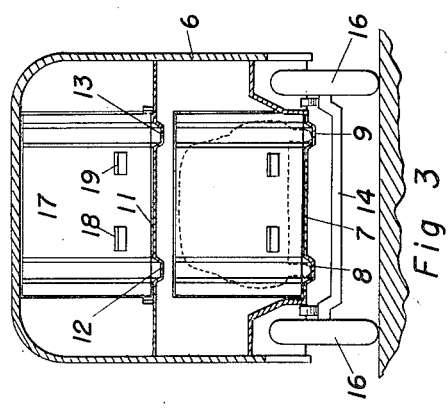
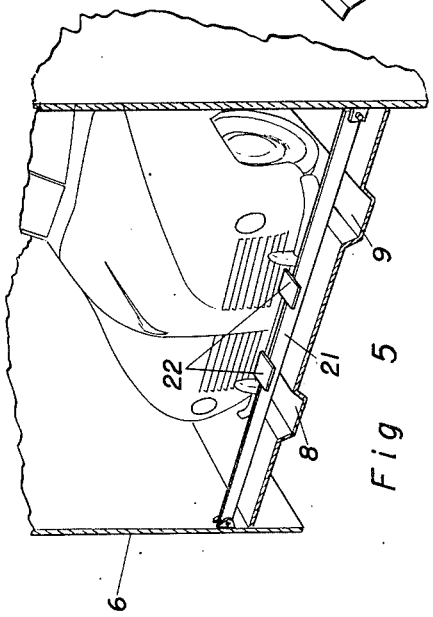

Patented Dec. 9, 1947

2,432,228

UNITED STATES PATENT OFFICE 2,432,228

AUTOMOBILE TRANSPORTING VEHICLE

Sidney De Lano, Los Altos, Calif.

Application February 25, 1946, Serial No. 649,783

2 Claims. (Cl. 214—85)

This invention relates to improvements in transportation means and has particular reference to transporting a plurality of vehicles in stacked relation to each other.

The principal object of this invention is to provide a truck or trailer construction wherein a plurality of motor vehicles may be stacked therein so as to be transported, as for instance from a factory to a point of distribution.

A further object is to provide means whereby the vehicles may be quickly loaded and the vehicles secured therein without requiring any complicated securing means.

A further object is to provide means whereby the cars being transported may be moved from one truck or trailer to another without unloading and reloading.

A further object is to provide a construction which is economical to manufacture and one which will comply with all of the usual motor vehicle codes as to length, clearance and all other safety factors which might be on the statutes.

Other objects and advantages will be apparent during the course of the following description.

In the accompanying drawings forming a part of this specification and in which like numerals are employed to designate like parts throughout the same, Fig. 1 is a side elevation of a motor vehicle and trailer constructed in accordance with my invention, the sides being removed to show the interior arrangement.

Fig. 3 is a cross sectional view taken on the line 3—3 of Fig. 2.

Fig. 4 is an enlarged detailed cross sectional view taken on the line 4—4 of Fig. 1.

Fig. 5 is a fragmentary detailed perspective view of the locking bar, and

Fig. 6 is a fragmentary detailed perspective view of the loading ramp.

In the transportation of vehicles from the factory or assembly plant to the point of distribution it has been customary to either drive the cars singly in caravan formation or to stack them in railroad cars, or in trailers.

In driving the cars in caravan style many accidents were caused on the highway and the new cars were sometimes overdriven as to speed, with resulting damage to the cars. When stacked in railroad cars a considerable period of time was required for loading even with the factory loading facilities and the same was true as to the unloading process without the factory facilities; also damage to the cars resulted from rough handling while getting them into and out of the freight car doors and in stacking them onto the trailers, inasmuch as only two or three at most could be placed upon a trailer and it was, therefore, necessary to stack them on a special framework, such framework having to be installed and removed at each loading operation. This procedure also required a considerable period of time as well as the assistance of special mechanics who understood this particular mode of assembly.

Applicant has, therefore, devised a transportation tractor and trailer wherein the cars will be placed one above the other, and by lowering the center of gravity, the entire height will be within standard limits.

Further, applicant has provided means whereby the vehicles to be transported may be driven or moved into the trailer and directly therethrough into the tractor.

He has also provided simple means for preventing the vehicles from moving either laterally, horizontally or vertically; in other words, applicant has provided simple means for locking the vehicles in the tractor and trailer against any movement with relation thereto.

In the accompanying drawings wherein for the purpose of illustration is shown a preferred embodiment of my invention, the numeral 5 designates a tractor as a whole, and the numeral 6 a trailer. As both of these vehicles are substantially the same as to interior construction, but one will be described.

Figure 1:
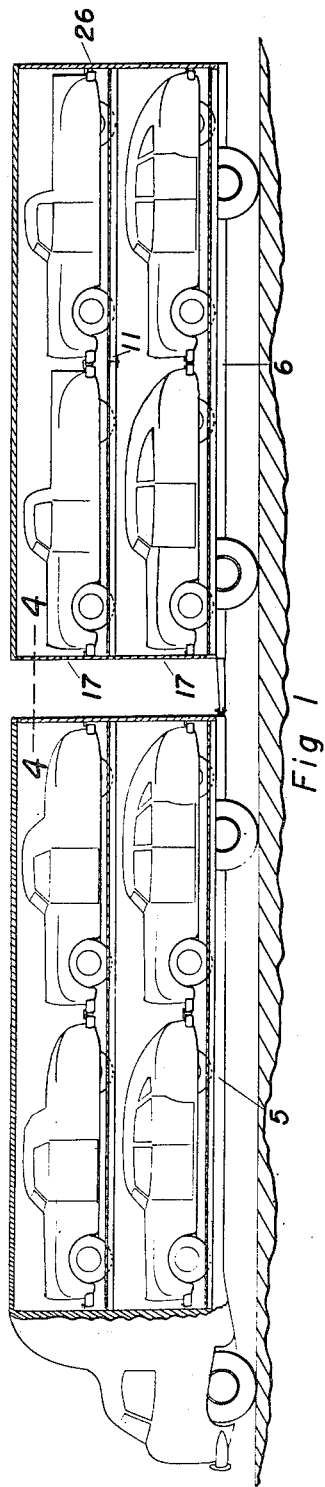
Figure 2:
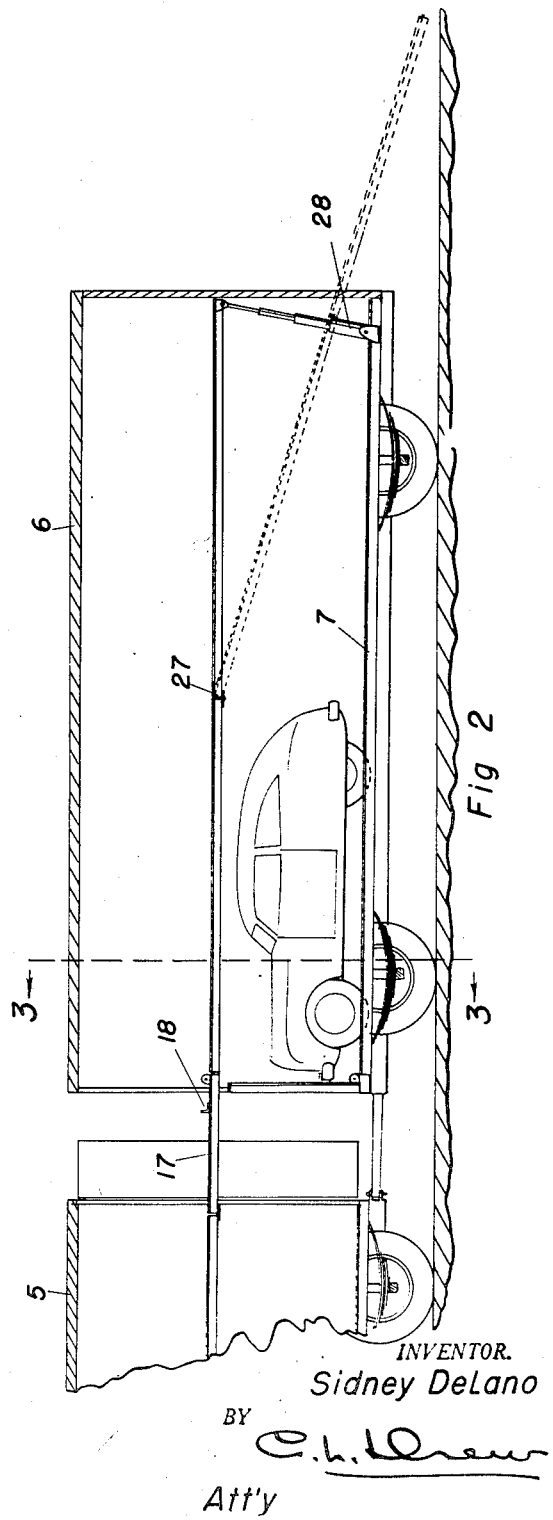
Fig. 2 is an enlarged view of the trailer and showing the ramp construction.

Referring to Fig. 2, it will be noted that the bottom 7 of the trailer is provided with depressed tracks, as shown at 8 and 9, whereby a vehicle may roll thereon and be held against sidewise movement.

Positioned above the bottom 7 is an upper deck 11, which also has tracks 12 and 13 which correspond to the tracks 8 and 9.

It will be noted that the vehicle body is mounted on a drop axle 14 which has the customary ground-engaging wheels 16. This places the center of gravity of the entire load comparatively low, and also provides for the proper clearance under bridges, viaducts and the like.

Referring to Fig. 4, it will be noted that the front end of the trailer 6 is provided with a door 17 which, when moved to the position of Fig. 4, forms a continuation of the tracks 8 and 9 and connects them with the corresponding tracks in the tractor 5.

It will also be noted that angular brackets 18 and 18 are mounted on the door so that when the same is closed these brackets will serve as hold-downs by overlying and engaging the front bumper of the vehicle being transported.

Mounted midway of the trailer is a pivoted bar 21 which has a pair of plates 22 secured thereto, which are adapted to overlie the rear bumper of the car in the front of the trailer and the front bumper of the car in the rear of the trailer.

Angular brackets 23 and 24 are attached to the rear doors 26 of the trailer so that when the rear doors are closed these brackets will overlie the rear bumper of the rear cars in the trailer.

In order to elevate the cars to the second deck, 11 of the truck or trailer, I pivot the rear half of the upper deck as at 27 and support the free end by a pair of hydraulic jacks 28.

In order to raise a car from the ground to the lower end of the upper deck, or to the lower floor, I provide a pair of removable tracks 29, which may be hooked onto either the floor 7 or deck 11.

It will thus be seen that with this arrangement I can drop the front doors 17 and lower the rear end of the deck 11, as shown in Fig. 2; then by connecting the tracks 29, a vehicle may be moved to the upper deck and through to the tractor.

After the upper deck of the tractor has been loaded the upper deck of the trailer may be loaded, the last vehicle coming to rest upon the inclined portion of the upper deck, after which the jacks 28 are raised to move the vehicle to a level position.

The tracks 29 are then connected to the lower level and the cars moved thereonto.

It will be apparent that when the first vehicles have been moved into the tractor and trailer, that the bar 21 will be lowered, and that when the second vehicles are moved into their position, the closing of the doors will lock them into position, through the fact that the brackets 18 and 18 will engage the front bumpers; the plates 22 will engage the back bumper and front bumper of the adjacent cars and the rear bumper will be held by the brackets 23 and 24.

When the vehicles are thus locked into position it will be impossible for them to move in any direction so as to cause an unbalanced load.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a vehicle for transporting other vehicles, a body having two spaced vehicle-supporting surfaces arranged one above the other, each of said surfaces having tracks formed therein, said body having doors formed in its front end, each of said doors having tracks formed therein, said tracks forming a continuation of said first mentioned tracks when said doors are moved to a horizontal tail-gate position whereby vehicles may be moved over said doors as in passing from one vehicle to another.

2. In a structure as set out in claim 1, and means carried by said doors and serving when said doors are closed to engage a portion of the vehicle being transported to prevent vertical movement of the same with respect to its supporting tracks.

SIDNEY DE LANO.

REFERENCES CITED

The following references are of record in the file of this patent:

UNITED STATES PATENTS

| Number | Name | Date |
| --- | --- | --- |
| 2,004,439 | Judd | June 11, 1935 |
| 2,146,567 | Donlinger | Feb. 7, 1939 |
| 2,251,358 | Judd et al. | Aug. 5, 1941 |
| 2,385,115 | Stuart | Sept. 18, 1945 |
| 2,402,283 | Hewitt | June 18, 1946 |